United States Patent [19]
Solis

[11] 3,936,283
[45] Feb. 3, 1976

[54] COMPACT GAS PURIFIER
[76] Inventor: Frank Solis, 4283 Tujunga Ave., North Hollywood, Calif. 91604
[22] Filed: Sept. 30, 1974
[21] Appl. No.: 510,760

[52] U.S. Cl. .................. 55/230; 55/241; 55/274; 55/279; 55/DIG. 34; 261/91; 21/74 R
[51] Int. Cl.² .................................. B01D 47/06
[58] Field of Search ............ 55/227, 230, 239, 241, 55/247, 249, 274, 279, DIG. 27, DIG. 34; 261/91, 119 R, 18 R; 21/74 R

[56] References Cited
UNITED STATES PATENTS

| | | | |
|---|---|---|---|
| 1,853,853 | 4/1932 | Fleisher | 261/91 |
| 2,189,021 | 2/1940 | Schury | 55/230 |
| 2,715,056 | 8/1955 | Wilson | 55/279 X |
| 2,841,369 | 7/1958 | Carraway | 55/230 X |
| 3,306,010 | 2/1967 | Garofalow et al. | 55/227 X |
| 3,323,784 | 6/1967 | Fazio | 261/18 R |
| 3,385,032 | 5/1968 | Crabbe | 55/249 |
| 3,528,781 | 9/1970 | Gelfman et al. | 55/279 X |
| 3,743,181 | 7/1973 | Bentley | 261/18 R |

FOREIGN PATENTS OR APPLICATIONS 445,889   4/1936   United Kingdom.................. 55/230

*Primary Examiner*—Frank W. Lutter
*Assistant Examiner*—David L. Lacey

[57] ABSTRACT

This invention is a compact gas purifier useful as a home air purifier. Gas scrubber action is achieved in a specially shaped bowl partially filled with liquid. A central rotor drives the liquid by centrifugal force out and up the wall of the bowl to a re-entrant rim which directs the liquid back into the central region of the bowl in a spray. Gas to be purified is drawn in over the rim of the bowl, down through the spray of liquid and up out through a central cylindrical tube which surrounds the top of the rotor.

6 Claims, 2 Drawing Figures

U.S. Patent  February 3, 1976  3,936,283
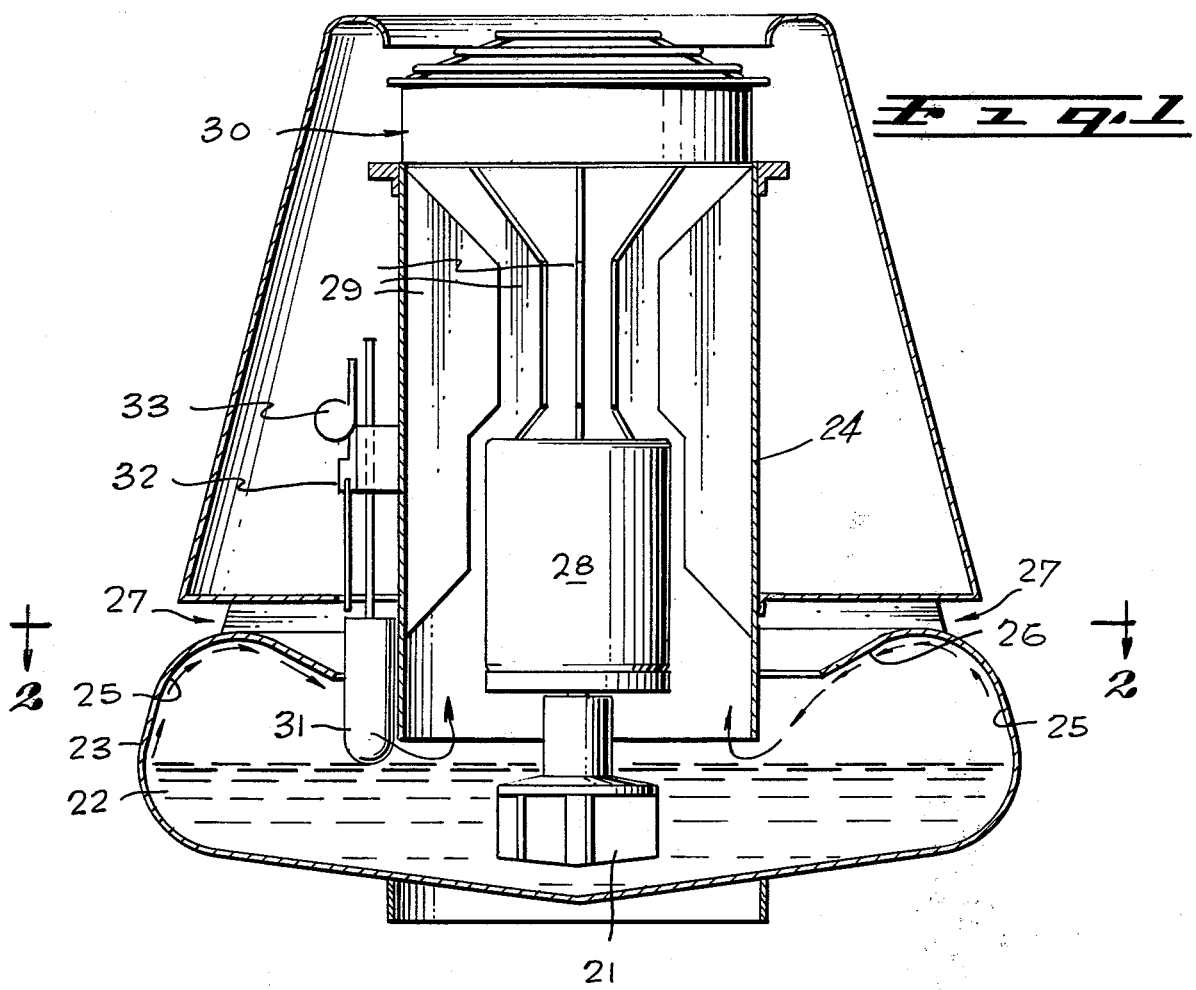
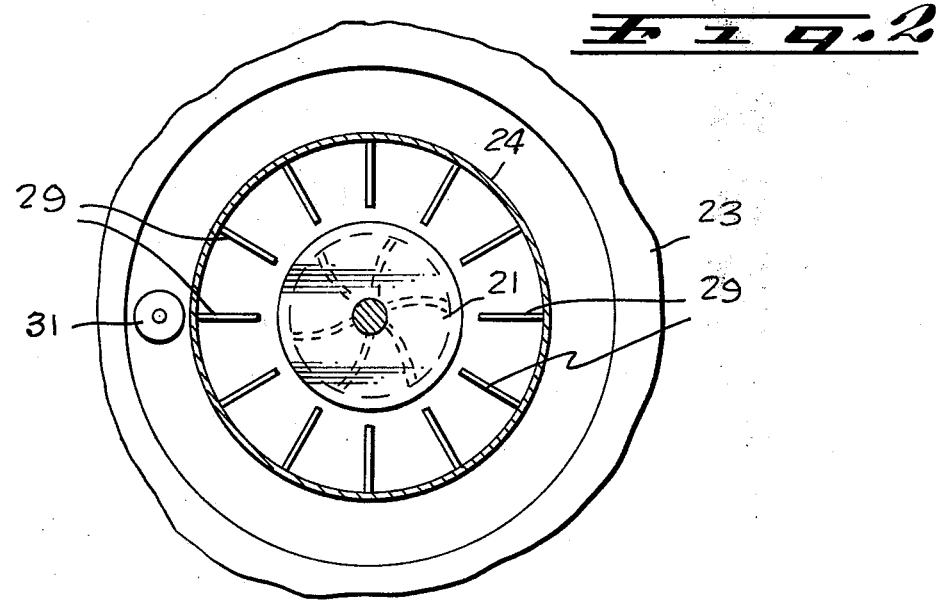

COMPACT GAS PURIFIER

BACKGROUND

Hundreds of thousands of people suffer from hay fever and other allergies caused by dust pollen and smog in the air. Conventional filters with pore size small enough to remove the irritant particles plug readily and require heavy noisy blowers to drive the air through the filters. Such filters do not remove chemical vapors which make up much of the common "smogs."

Gas scrubbers provide an excellent method of gas purification and gas conditioning. They have been in use in various applications for nearly a hundred years. Although scrubbing can be achieved by bubbling the gas through a liquid, much greater gas cleaning efficiency is achieved by dispersing the liquid as a spray in the gas and then separating the liquid droplets from the gas. The spray is generally created by some jetting or centrifugal precipitator. These usually involve a large noisy piece of equipment and consequently there has been no application of the method to home air purification or conditioning.

Recent developments in the ecology field have made it clear how significant air pollutants are in impairing health. There is a desparate need for simple, economical and practical air purification systems for home use.

SUMMARY

This invention describes a small, portable gas scrubber system. The compact centrifugal spray generator operates in a specially shaped bowl such that centrifugal force actually throws the liquid inward toward the rotor. The gas is drawn into the system in a direction parallel to the motion of the liquid so that liquid is not driven or splashed back out the gas inlet. The gas is drawn out of the system upward through a vertical column so that gravity acts as a gas-liquid separator. The gas is drawn out over the top of the centrifugal rotor giving some centrifugal separation. Most important of all, the liquid droplets are generated by a mechanism that gives each droplet a velocity directing it back into the liquid reservoir. By a proper choice of the liquid solution some conditioning of the gas is possible with respect to humidity and desirable vapours. In hot arid climates the scrubber can act as an evaporator cooler. In humid weather a liquid such as ethylene glycal solution can remove moisture from the air. The air inlet and outlet parts are designed to set up an air circulation pattern in a closed room such that continued operation will cause essentially all of the air in the room to be cycled through the purifier.

It is an object of this invention to provide a compact, portable gas purifier and conditioner.

It is an object of this invention to provide a room air purifier which circulates the air in a room recycling it continuously through the purifier.

DESCRIPTION OF THE DRAWINGS

FIG. 1 is a cross section of the air purifier.

FIG. 2 is a plan view of a horizontal section taken across the elevation 2—2.

The bowl 23 contains water or other liquid 22. The motor 28 drives the rotor 21 at high speeds causing the liquid 22 to be thrown outward against the specially curved wall 25 so that the moving fluid is carried by inertia up the wall and back in along the upper surface 26 of the bowl. The inertia of the liquid causes it to be thrown from the upper surface 26 in a sheet inward against the wall of the inner cylinder 24 from whence it splashes downward in a spray. This liquid spray is driven downward by its own inertia and gravity back on to the rotor 21 to be recycled.

The float 31 rests on the liquid 22 in the bowl and when it falls below a predetermined level, it activates the switch 32 turning on the light 33 to indicate the need for additional liquid.

The blower 30 at the top of the inner cylinder 24 draws air in through the vents 27, down through the sheet of liquid directed off of the surface 26 on to the cylinder wall 24, and then through the spray generated by the liquid splashing off of the wall 24. The air is then drawn up through the inner cylinder 24 past the motor 28 and out through the blower 30. The vanes 29 provide a large surface area on which any droplets of liquid carried upward with the flowing air may impinge and condense. This liquid then flows down the vanes 29 and inner cylinder wall 24 to the bowl 23 to be recycled.

The liquid 22 may be water or any combination of water and organic liquids. It may contain salts to lower the vapor pressure of the water or bases to cause absorption of carbon dixoide and other acidic vapors. It may contain antiseptics, medicinal vapours, or odorants. An optimum carrier liquid would be a solution of water and ethylene glycol such that air in equillibrium with this solution at ambient temperatures would have a relative humidity of about 50%. Water would be absorbed from air of higher humidity and would evaporate from the solution into air of lower humidity.

PREFERRED EMBODIMENT

The preferred embodiment is that shown in FIGS. 1 and 2. The liquid spray is generated in the specially shaped bowl by the centrifugal rotor which hurls the liquid out and back in from the re-entrant rim. Air is drawn in over the rim, down through the spray and up out the central cylindrical column. The preferred liquid is a solution of water and ethylene glycol with a water vapor pressure corresponding to approximately 50% relative humidity containing disinfectants and deodorizers, such as pinene, in solution.

What is claimed is:

1. An improved gas purifier comprising:
   a. A bowl with a reentrant outer rim, said rim pointing in and down toward the central region of said bowl
   b. A liquid contained in said bowl
   c. A rotor in the center of said bowl
   d. Means for spinning said rotor with such force that said liquid in said bowl is carried outward, up the wall of said bowl, around said reentrant rim and is hurled back down toward the central region of said bowl to be recycled,
   e. A hollow tube like structure opening into said central region of said bowl through which gas may flow out of said central region of said bowl allowing additional gas to flow into said central region of said bowl past said reentrant rim of said bowl through said liquid being hurled downward and inward from said rim,
   f. Means for drawing gas into said bowl between said rim and said tube and out through said tube so as to cause gas to flow through said purifier.

2. The improved gas purifier claimed in claim 1 wherein the tube by which said gas is drawn out of said bowl is a hollow vertical cylinder above the central region of said bowl, the bottom of said cylinder extending down into said bowl such that said liquid hurled inward from said reentrant rim strikes said cylinder and is deflected back outward and downward, said gas entering into said central region of said bowl between the rim of said bowl and said hollow central cylinder and exiting up through said hollow central cylinder.

3. A gas purifier as claimed in claim 2 wherein said means for drawing gas into said bowl comprises a motor and blower located in said hollow vertical cylinder above said bowl said motor driving said blower and said blower drawing gas into said bowl between said rim and said cylinder and out through said cylinder.

4. The improved gas purifier claimed in claim 1 wherein said liquid is a solution of water and ethylene glycol.

5. The improved gas purifier claimed in claim 1 wherein said liquid is a solution of water and ethylene glycol, and said liquid also contains disinfectants and deodorants.

6. The improved gas purifier as claimed in claim 1 further comprising, a float in said bowl which floats on said liquid, an electric light external to said bowl controlled by an electric switch external to said bowl, means by which said switch is connected to said float so as to cause said switch to be activated, turning on said light, when said float falls below some preset level.

* * * * *